Dec. 23, 1969    K. LAUX    3,485,263
PULSE VALVE, PARTICULARLY FOR SPRINKLER PLANTS
Filed May 12, 1965    2 Sheets-Sheet 1

⊥ MOVABLE SEAL
⊥ RIGID CONNECTION

Inventor:
KARL LAUX

By Harris and Nydick
ATTORNEYS

⊥ MOVABLE SEAL
⊤ RIGID CONNECTION

Inventor:
KARL LAUX

United States Patent Office 3,485,263
Patented Dec. 23, 1969

3,485,263
PULSE VALVE, PARTICULARLY FOR
SPRINKLER PLANTS
Karl Laux, Pollingerstrasse 11, St. Gilgen,
Salzburg, Austria
Filed May 12, 1965, Ser. No. 455,147
Claims priority, application Germany, July 11 1964,
L 48,254; May 16, 1964, L 47,825
Int. Cl. A01k *31/48;* G05d *7/01*
U.S. Cl. 137—408                    14 Claims

ABSTRACT OF THE DISCLOSURE

A pulse valve, particularly for use in sprinkler systems, which controls the flow of water or other medium through the conduit lines of the system by a change in the pressure acting upon the valve. The valve automatically and intermittently shuts off the flow when the pressure acting upon it departs from a predetermined value and reopens the flow if the pressure reaches a predetermined value.

---

The invention relates to a pulse valve, particularly for sprinkler systems. Such a pulse valve controls the increase and decrease of the pressure in the pipes of the system, e.g. between 29.4 and 147 p.s.i.g. A single pulse valve is generally sufficient for the system unless the sprinkler system is a very large one.

An automatically acting shut-off valve is provided ahead of each sprinkler nozzle or each sprinkler pipe pattern and responds to the increase and decrease of the pressure in the conduits or pipes. This shut-off valve opens and closes the flow of the medium such as water to the different sprinklers or sprinkler groups. Each shut-off valve is provided with an automatically acting draining and de-airing valve which acts as a brake or buffer against air and water hammers respectively.

It is the purpose of the invention to improve and to simplify a pulse valve, particularly for use in sprinkler systems, the control force of which is supplied by the medium to be shut off, said medium traversing the valve through wall openings controlled by a control assembly.

In a known valve of this type the flow direction of the medium is normal to the axis of the valve.

According to the invention the pulse valve is arranged in such a way that the flow direction of the medium is coaxial to the valve axis. In comparison with the known valves of this type, considerable advantages are obtained for the production as well as for the use of this valve.

The purpose of the invention is attained by arranging the valve as a fully relieved telescopic slide, the middle part of which is formed by a pipe inserted into the pressure line with a partition wall, in front of and behind which the wall perforations are arranged, which are controlled by a slide arranged on the pipe effecting relative movements between the pipe and the slide.

In an embodiment of the invention the slide is provided with three chambers, two chambers of which release or interrupt the flow of the medium through the wall perforations of the pipe, while the third chamber forms the cylinder of a flange fastened on the pipe and acting as a piston, said flange effecting the axial movement of the slide as caused by the medium.

According to a further feature of the invention the cylinder chamber of the slide is provided with a control assembly preferably embodied as a piston control which assembly controls the admission of the medium into the cylinder chambers at both sides of the piston and its outflow from said chambers.

In the first embodiment of the invention, the flow direction of the medium is coaxial to the valve axis. In this connection certain difficulties are to be overcome in respect of the structural arrangement of the control assembly and the channel arrangement for the medium. These difficulties are eliminated by a second embodiment of the invention, in which the outer valve jacket is stationary, while internally a cylinder moves axially to the flow direction of the medium.

In a second embodiment of the invention, the valve casing inserted into the pressure line is subdivided into three chambers in which an axially shiftable cylinder is arranged transversely to the flow direction on a stationary piston, the open end of which cylinder, lying underneath the piston and being provided with ports, forms a first chamber, and the closed end of which cylinder, lying above the piston, forms a second chamber. The cylinder is provided with a control aggregate feeding water under pressure from the first chamber alternatively to the second chamber or to the uppermost chamber, while the chamber not being fed is drained.

In this embodiment the stationary piston rod is provided with channels connecting the chambers within the cylinder permanently with the control assembly. The control assembly is preferably mounted on the uppermost chamber and is arranged as a piston control, controlling both the admission of the medium into the chambers at both sides of the cylinder lid, and its outflow from these chambers.

Further embodiments of the invention will now be described by way of example with reference to the accompanying drawings in which.

Figure 1:
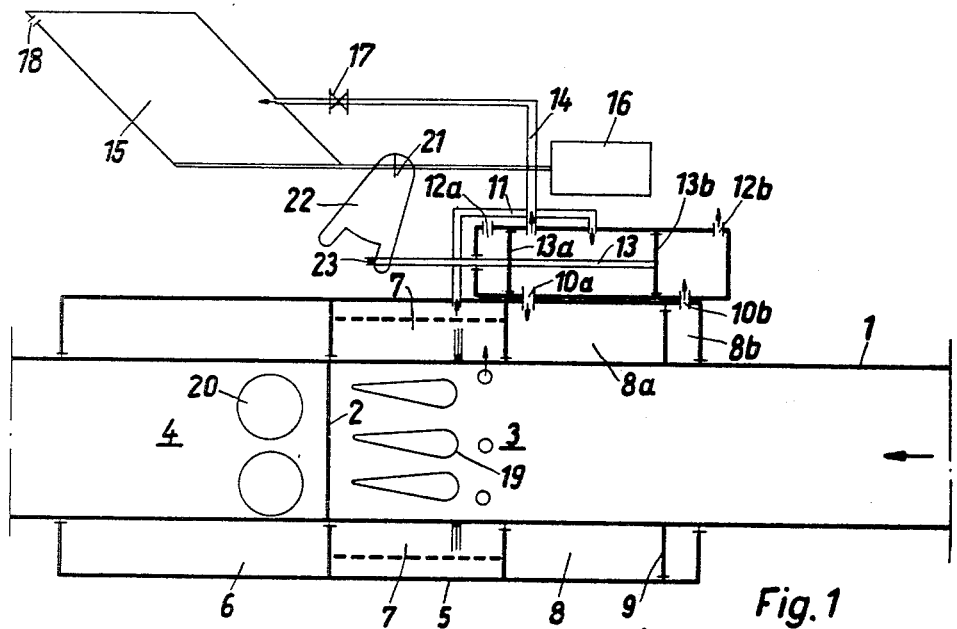
FIG. 1 is an embodiment of the object of the invention with closed pulse valve.
Figure 2:
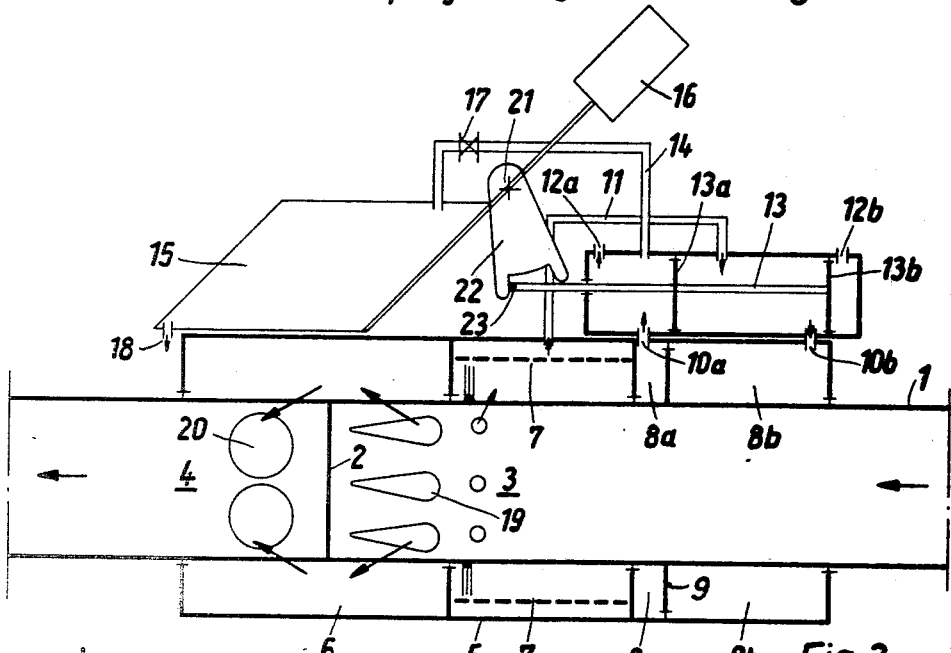
FIG. 2 is the embodiment of FIG. 1 but with opened pulse valve.

In the embodiment according to FIGS. 1 and 2, a passage pipe 1 interrupted by a partition wall 2 is mounted in the pressure line. Thus chambers 3 and 4 are formed in the passage pipe 1. These chambers are surrounded by the axially shiftable cylindrical slide 5 forming by circumferential seals the three chambers 6, 7 and 8. The operating piston 9 is rigidly fixed to the pipe 1 and arranged in the chamber 8 whereby it subdivides the chamber 8 into the chambers 8a and 8b. The chambers 8a and 8b are connected via ports 10a and 10b with the reversing device. The reversing device is permanently connected by a pipe 11 with water under pressure in chamber 7. The ports 12a and 12b lead into the open air. The reversing piston 13 with the seals 13a and 13b alternatively connects the channels in the following manner:

In the closing position according to FIGURE 1, the pressure water pipe 11 is connected with the port 10a, whereby pressure water is fed into the chamber 8a, while the chamber 8b may empty through the ports 10b and 12b.

Thus the slide 5 is shifted toward the right with reference to piston 9 in such a manner that the chamber 8a is enlarged until the final position in reference to the stationary piston 9 is reached and remains in this condition. In this position of the slide there is no connection between the chambers 3 and 4. The slide is closed. With a reversing piston 13 in the same position, a pipe 14, partly in the form of a flexible pipe, is also connected with pipe 11 so that water flows into a tiltable vessel 15. The tilting vessel 15 remains in the position of FIG. 1 until the water therein overcomes the weight of counter weight 16. The necessary time period may be regulated by a valve 17.

As soon as a slight overweight is present in the tilting vessel 15, the gravity center of the water contents is shifted towards the exterior due to the rotational direction of the vessel, the effective length of lever arm at the fulcrum 21 is extended as compared with the effective length of the lever arm of the counterweight 16, whereby additional accelerating forces are transmitted to the shifting fork 22 and thus through stop 23 to the reversing piston rod 13, thus assuring a great reliability for the reversing operation. After the vessel is emptied, the counterweight 16 returns said vessel with a sufficient accelerating force, as the counterweight 16 moves away from the fulcrum 21 as seen in a horizontal plan during the rotational movement, while the center of gravity of the emptied tilting vessel keeps more or less its distance from the fulcrum 21.

After the first tilting the opening position according to FIG. 2 is reached. Chamber 8a is now connected to the open air by means of the ports 10a and 12a, while chamber 8b is fed with pressure water from the chamber 7 through the pipe 11 and port 10b. The slide 5 moves reversely, that is, toward the left in reference to piston 9 and remains in its position until the tilting vessel 15 has emptied itself through the nozzle 18 so far that the counterweight 16 gets overweight. In the left position, the chamber 3 is connected with chamber 4 by means of apertures 19 and 20 and the chamber 6. The medium can flow through. The period of time of this position may be determined by interchangeable nozzles 18.

The relative speed between the slide 5 and the pipe 1 shall not exceed about 1 3/16″ per second. The adjustment is made by regulating the pressure water pipe 11.

In the shown embodiment the pipe 1 is supposed to be stationary so that the slide 5 moves, but the pipe may be movable and the slide stationary.

The water vessel 15 is only filled up to about 2/3 or 3/4 at most. In the shown embodiment of the container as a parallelogram the effective length of the lever arm increases immediate upon the beginning of the tilting process in reference to the fulcrum 21, thereby shifting the center of gravity to the outside. The thus obtained forces accelerate the movement of the control piston 13 from the position of FIGURE 1 into the position according to FIGURE 2. With container 15 in this position, it is emptied during the period adjusted by the draining nozzle 18 until the counterweight 16 causes reshifting into the position according to FIGURE 1 using similar accelerating forces.

The reversing aggregate may also be controlled electrically, by hand or by other power pulses. These operating possibilities become important when the pulse valve according to the invention is not used for sprinkler systems but in conduits of any other type.

Figure 4:
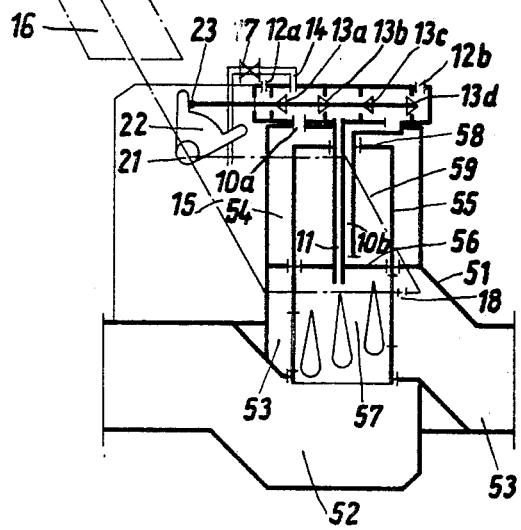
FIG. 4 is the embodiment of FIG. 3 but with opened pulse valve.
Figure 5:
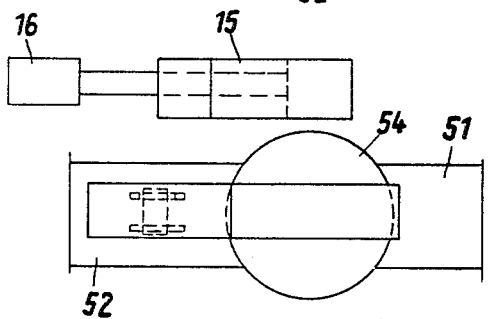
FIG. 5 is a plan view upon FIG. 4.
Figure 3:
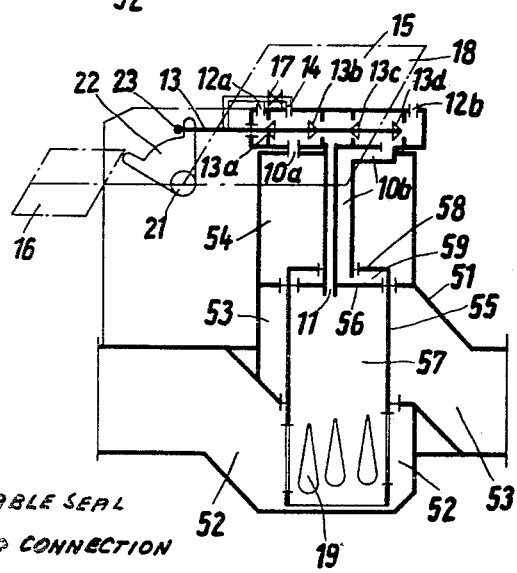
FIG. 3 is a second embodiment of the object of the invention with closed pulse valve.

In the embodiment according to FIGURES 3 to 5 the valve casing 51 is incorporated into the pressure conduit. This casing is subdivided into three chambers 55, 53 and 54.

In these three chambers, a cylinder 55 with lid 58 is mounted which cylinder is shiftable axially and transversely to the flow direction.

The open end of the cylinder 5 lying underneath the piston 56 is provided with passage openings 19 and forms a chamber 57.

The closed extremity of the cylinder 55 lying above the piston 56 forms a chamber 59.

The chambers 54 and 59 are connected with the control assembly by means of ports 10a, 10b.

Through the duct 11, the control assembly is permanently in connection with the chamber 57.

The ports 12a and 12b lead from the control assembly into the open air. The control assembly itself is embodied as a piston control with the piston 13 and the gates 13a, 13b, 13c, 13d.

The ports and the duct are controlled in operation by the control assembly as follows:

In the closed position (FIGURE 3) the pressure water duct 11 is connected along the open gate 13b with the port 10a. Thereby pressure water from the chamber 57 is admitted into the chamber 54 and holds the cylinder 55 in its closing position.

The chamber 59 has emptied before through the port 10b along the opened gate 13d through port 12b into the open air In the closed position there is no connection between the chambers 52 and 53

Besides, in this position, the pipe 14 is connected through the port 10a with the duct 11.

The pipe 14 connects the control assembly with the tilting vessel 15. The pipe 14 may be formed in part by a flexible pipe.

The closed position lasts till the tilting vessel 15 gets overweight over the counterweight 16. The time necessary may be adjusted by the valve 17.

As soon as a slight overweight builds up in the tilting vessel 15, the center of gravity of the water shifts to the outside in the rotational direction of the vessel, thus increasing the effective length of lever arm on the fulcrum 21 over the effective length of the lever arm of the counterweight 16, whereby additional accelerating forces are transferred through the shifting fork 22 and thus through the stop 23 to the reversing piston rod 13.

Thus a great operational safety is assured for the reversing process.

After the vessel 15 is emptied, the counterweight 16 returns the vessel with sufficient accelerating forces, as the counterweight 16 moves away from the fulcrum 21 as seen in a horizontal plane during the rotational movement, while the center of gravity of the emptied vessel 15 keeps more or less its distance from the fulcrum 21.

After the first tilting the opening position according to FIGURE 4 is reached.

At this, the chamber 54 is connected over the channel 10a along the opened gate 13a with the outlet 12 opening into the open air.

Simultaneously pressure water from the chamber 57 is fed into the chamber 59 through the duct 11 along the opened gate 13c through the port 10b. Thereby the cylinder 55 is moved upwardly and comes into the open position, where it remains until the tilting vessel 15 has drained through the nozzle 18 and is again reversed by the counterweight 16.

In the open position, the chamber 52 is connected with the chamber 59 through the chamber 57 and the passage openings 19, so that the medium for the pulse valve may traverse it. The holding time of the valve in the open position may be determined by interchangeable nozzles 18 in the tilting vessel 15.

The reversing assembly may also be operated electrically, by hand or by other power pulses.

What I claim is:

1. A pulse valve for controlling the flow of a flowable medium through a pressure conduit, said pulse valve comprising in combination:

a sleeve-shaped slide (5);

a control pipe (1) arranged to be included in the pressure conduit, the flow through which is to be controlled, said pipe extending through the slide coaxial therewith, said slide and said pipe being axially movable in reference to each other, said slide including walls defining three chambers (6, 7, 8) of which two chambers (6, 7) release or interrupt the flow of the medium through the wall perforations (19, 20) of the pipe (1) while the third chamber (8) forms the cylinder of a flange (9) constituting a piston and stationarily secured on the pipe (1), said piston causing said axial movement of the slide in response to pressure exerted by the medium upon the piston and slide walls;

a traverse partition wall (2) dividing said pipe into two compartments (3 and 4), said pipe including perforations (19, 20) on opposite sides of said partition wall for interconnecting said compartments; and a control assembly for controlling the position of the slide in reference to said perforations to open and close the same for an intermittent flow of the medium through said pipe via said compartments of the pipe.

2. Pulse valve according to claim 1, wherein said control assembly comprises a piston control (13, 13a, 13b) coacting with one of the chambers (8) of the slide (5), which assembly controls the admission of the medium into the chambers (8a, 8b) at both sides of the piston (9) and its outflow from these chambers.

3. Pulse valve according to claim 1, wherein a casing (51) inserted into the pressure conduit is subdivided into three chambers (52, 53, 54) in which an axially shiftable cylinder (55) is arranged on a stationary piston (56) transversely to the flow direction, the end of the cylinder lying underneath the piston (56) and being provided with passage openings (90) forming a chamber (57), while its closed end lying above the piston (56) forms a chamber (59), and wherein said control assembly is associated with the cylinder (55) through which assembly pressure water from the chamber (57) is fed alternatively to the chamber (59) or to the chamber (55) while the chamber (54 or 59) not being fed is drained.

4. Pulse valve according to claim 3, wherein a piston rod for the piston (56) is provided with channels (10b, 11) permanently connecting the chamber (59, 57) with the control assembly.

5. Pulse valve according to claim 3, wherein the control assembly is arranged on one of said chambers (54).

6. Pulse valve according to claim 1 wherein said control assembly comprises a movable control rod (13), the position of said rod controlling the position of the slide in reference to the pipe, a shifting fork (22) pivotal about a pivot axis (21), the angular position of the fork controlling the position of the rod, a vessel (15) connectable to said pipe for filling the vessel with medium from said pipe, and including a drain opening (18), said vessel being tiltably mounted and coupled to said fork for controlling the angular position of the fork by the volume of medium in the vessel, and a counterweight (16) biasing said vessel into a position in which the angular position of the fork and thus the position of the rod are such that the communication between the compartments is open when the volume of medium in the vessel is below the weight counterbalanced by said counterweight due to draining of the vessel through said drain opening thereof.

7. Pulse valve according to claim 6, wherein the tilting vessel (15) is in its longitudinal section in the form of a parallelogram pointing away from the pivot axis (21).

8. Pulse valve according to claim 6, wherein the tilting vessel (15) is connected by means of a flexible pipe (14) having a regulating valve (17) with the control assembly (13).

9. Pulse valve according to claim 6, wherein for controlling the outflow of the water from the tilting vessel (15) an interchangeable nozzle (18) is provided.

10. Pulse valve according to claim 1, wherein the perforations (19) of the partition wall (2) are in the form of isosceles triangles with a rounded-off base, the points of which are facing the wall (2).

11. Pulse valve according to claim 1, wherein the length of the perforations (19) on the upstream side of the wall (2) are at least about ⅔ of the diameter of the pipe (1).

12. Pulse valve according to claim 1, wherein the width of the base of each perforation (19) on the upstream side of the wall corresponds to about ⅕ to ⅐ of the slot length.

13. Pulse valve according to claim 1, wherein the perforations (19) on the upstream side of the wall are arranged in such a manner that the connection line of the perforations points form a circular line radial to the axis of the pipe (1).

14. Pulse valve according to claim 1, wherein the perforations (19) on the upstream side of the wall are arranged in such a manner that the connection (9) of the perforations points forms a screw line in respect to the axis of the pipe (1).

References Cited

UNITED STATES PATENTS 2,071,204   2/1937   Hunt _____ 251—344 X

WILLIAM F. O'DEA, Primary Examiner

DAVID R. MATTHEWS, Assistant Examiner

U.S. Cl. X.R.

239—67, 101; 251—344